(12) United States Patent
Gao et al.

(10) Patent No.: US 11,405,294 B2
(45) Date of Patent: Aug. 2, 2022

(54) METHOD AND APPARATUS FOR DETERMINING STATUS OF NETWORK DEVICE

(71) Applicant: Huawei Technologies Co., Ltd., Shenzhen (CN)

(72) Inventors: Yunpeng Gao, Nanjing (CN); Yuming Xie, Nanjing (CN); Xin Xiao, Nanjing (CN); Liang Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/027,319

(22) Filed: Sep. 21, 2020

(65) Prior Publication Data

US 2021/0006481 A1    Jan. 7, 2021

Related U.S. Application Data

(63) Continuation of application No. PCT/CN2019/078832, filed on Mar. 20, 2019.

(30) Foreign Application Priority Data

Mar. 22, 2018   (CN) .......................... 201810241478.1

(51) Int. Cl.
   *G06F 15/173* (2006.01)
   *H04L 43/0817* (2022.01)
   (Continued)

(52) U.S. Cl.
   CPC ........ *H04L 43/0817* (2013.01); *H04L 41/064* (2013.01); *H04L 41/0681* (2013.01); *H04L 41/5009* (2013.01)

(58) Field of Classification Search
   CPC .............. H04L 43/0817; H04L 41/064; H04L 41/0681; H04L 41/5009; H04L 41/147;
   (Continued)

(56) References Cited

U.S. PATENT DOCUMENTS

2004/0228428 A1   11/2004   Cho
2007/0061458 A1   3/2007    Lum
(Continued)

FOREIGN PATENT DOCUMENTS

CN   101442799 A   5/2009
CN   101729127 A   6/2010
(Continued)

OTHER PUBLICATIONS

Bajko, G., "Locating Mobility Servers"; draft-bajko-mos-dns-discovery-00.txt; IEIF Standard-Working-Draft; Internet Engineering Task Force; MIPSHOP WG, Internet Draft, Aug. 2007, pp. 1-7.
(Continued)

*Primary Examiner* — Anh Nguyen
(74) *Attorney, Agent, or Firm* — Slater Matsil, LLP (57) ABSTRACT

A method and an apparatus for determining a status of a network device are provided. A warning analysis device obtains a plurality of pieces of target key performance indicator KPI data of the network device within preset duration, processes the plurality of pieces of target KPI data to generate an element, forms the feature vector by using generated elements corresponding to the plurality of pieces of feature information, and analyzes the feature vector based on a preset warning analysis model, to determine the status of the network device. In this way, the status of the network device is determined by analyzing a plurality of pieces of target KPI data within a period of time, instead of by using only data at a moment. This improves the accuracy of determining the network device, so as to reduce an omission of a warning.

16 Claims, 5 Drawing Sheets

(51) Int. Cl.
*H04L 41/0631* (2022.01)
*H04L 41/0681* (2022.01)
*H04L 41/5009* (2022.01)

(58) Field of Classification Search
CPC ..... H04L 41/142; H04L 43/16; H04L 41/145; H04L 41/0631
See application file for complete search history.

(56) References Cited

U.S. PATENT DOCUMENTS

| | | | |
|---|---|---|---|
| 2007/0091846 | A1 | 4/2007 | Kim et al. |
| 2007/0091850 | A1 | 4/2007 | Lee et al. |
| 2007/0173283 | A1 | 7/2007 | Livet et al. |
| 2007/0183367 | A1 | 8/2007 | Park |
| 2008/0162387 | A1* | 7/2008 | Singh .................. H04L 41/16 706/14 |
| 2012/0179283 | A1 | 7/2012 | Krause |
| 2014/0355454 | A1 | 12/2014 | Serban et al. |
| 2016/0217022 | A1* | 7/2016 | Velipasaoglu ...... G06F 11/0772 |
| 2017/0013484 | A1 | 1/2017 | Liu et al. |
| 2017/0169143 | A1 | 6/2017 | Farahat et al. |
| 2018/0019910 | A1* | 1/2018 | Tsagkaris ............ H04W 28/18 |
| 2019/0364088 | A1* | 11/2019 | Fu ........................ H04L 43/08 |

FOREIGN PATENT DOCUMENTS

| | | |
|---|---|---|
| CN | 102026230 A | 4/2011 |
| CN | 102056283 A | 5/2011 |
| CN | 102056284 A | 5/2011 |
| CN | 102083194 A | 6/2011 |
| CN | 103178990 A | 6/2013 |
| CN | 103796296 A | 5/2014 |
| CN | 104469833 A | 3/2015 |
| CN | 104881436 A | 9/2015 |
| CN | 106952029 A | 7/2017 |
| JP | 2011171981 A | 9/2011 |
| JP | 2017204858 A | 11/2017 |
| RU | 2630415 C2 | 9/2017 |
| WO | 2015057119 A1 | 4/2015 |

OTHER PUBLICATIONS

Zuniga, J.C. et al., "L3 Transport for MIH Services", IEEE 802.21 Media Independent Handover, IEEE 802.21 session, San Francisco, CA, US, Jul. 19, 2007, pp. 1-10.

Bajko, G., "Dynamic Host Configuration Protocol (DHCPv4 and DHCPv6) Options for Mobility Servers (MoS)"; draft-bajko-mos-dhcp-options-00.txt; IETF Standard-Working-Draft; Internet Engineering Task Force; MOPSHOP WG Internet Draft, Aug. 2007, pp. 1-8.

Melia, T. et al., "Mobility Services Transport Protocol Design"; draft-ietf-mipshop-mstp-solution-00.txt, IETF Standard-Working-Draft; Internet Engineering Task Force; Mipshop WG, Internet-Draft, Dec. 17, 2007, pp. 1-30.

Tsirtsis, G, et al., "Triggering AAA from DHCP Relay Agents"; draft-ietf-dhc-aaa-ra-OO.txt, IETF Standard-Working-Draft; Internet Engineering Task Force; IETF; CH; vol. dhc; Jan. 1, 2001, pp. 1-7.

* cited by examiner

METHOD AND APPARATUS FOR DETERMINING STATUS OF NETWORK DEVICE

CROSS-REFERENCE TO RELATED APPLICATIONS

This application is a continuation of International Application No. PCT/CN2019/078832, filed on Mar. 20, 2019, which claims priority to Chinese Patent Application No. 201810241478.1, filed on Mar. 22, 2018. The disclosures of the aforementioned applications are hereby incorporated by reference in their entireties.

TECHNICAL FIELD

This application relates to the field of communications technologies, and in particular, to a method and an apparatus for determining a status of a network device.

BACKGROUND

With continuous development of communications technologies, complexity of a network system increases, and maintenance costs arising from reliability of network devices increase. Therefore, to reduce a problem that costs are relatively high because a network device is maintained after a fault occurs, a warning may be provided when a potential fault of the network device occurs. In other words, the warning may be provided when the fault is about to occur. Therefore, it is important to monitor a status of the network device.

Currently, during operation and maintenance of an existing network system, a threshold alarm system is usually established for service performance data of the network device, and a status of a device on a network is monitored by setting different threshold ranges. Specifically, a current status of the network device is determined at a moment by determining a status corresponding to a specified threshold range to which an indicator value of the service performance data of the network device belongs.

However, in practice, for example, when a network device that is in a potential fault state is working, the network device may be in a normal working state at a moment, and may be in the potential fault state at another moment. Therefore, obviously in the foregoing method, for a network device with a potential fault, if it can only be determined that the network device is normal when the network device is in the normal working state, it cannot be identified that the network device has the potential fault, and consequently a warning is omitted. Therefore, accuracy of determining the status of the network device in the foregoing method is relatively low.

SUMMARY

This application provides a method and an apparatus for determining a status of a network device, to resolve a problem that accuracy of determining the status of the network device is relatively low.

According to a first aspect, this application provides a method for determining a status of a network device, where the method includes:
obtaining, by a warning analysis device, a plurality of pieces of target key performance indicator (KPI) data of the network device within preset duration; obtaining, by the warning analysis device, a plurality of pieces of feature information; processing, by the warning analysis device, the plurality of pieces of target KPI data based on each piece of feature information, to generate an element corresponding to each piece of feature information; and forming, by the warning analysis device, the feature vector by using generated elements corresponding to the plurality of pieces of feature information, and analyzing the feature vector based on a preset warning analysis model, to determine the status of the network device, where any piece of feature information is used to represent a calculation manner of an element that is in a feature vector and that corresponds to the feature information.

In the foregoing method, the status of the network device is determined by analyzing a plurality of pieces of target KPI data within a period of time, instead of by using only data at a moment. This improves the accuracy of determining the network device, so as to reduce an omission of a warning.

In a possible design, before analyzing the feature vector based on the preset warning analysis model, the warning analysis device needs to generate the warning analysis model. A specific method may be as follows: The warning analysis device obtains feature vector samples corresponding to different statuses of the network device, and performs logistic regression processing on each status and a feature vector sample corresponding to the status of the network device, to obtain the warning analysis model.

According to the foregoing method, the warning analysis device may generate the warning analysis model, so that the warning analysis device subsequently determines the status of the network device based on the warning analysis model.

In a possible design, the warning analysis device analyzes the feature vector based on the preset warning analysis model, to determine the status of the network device. A specific method may be as follows: The warning analysis device analyzes the feature vector based on the warning analysis model, to determine a probability of each status of the network device, and multiplies each probability by a preset reference value of a status corresponding to the probability, to obtain a plurality of products; and the warning analysis device adds the plurality of products to obtain a status indication value, determines a specified indication value range to which the status indication value belongs, and uses a status corresponding to the specified indication value range as the status of the network device.

According to the foregoing method, the warning analysis device may accurately determine the status of the network device, so that the network device is subsequently maintained based on the status of the network device.

In a possible design, the warning analysis device obtains the plurality of pieces of target KPI data of the network device within the preset duration. A specific method may be as follows: The warning analysis device receives KPI data that is of the network device and that is continuously sent by a network management device, and obtains the plurality of pieces of target KPI data within the preset duration from the received KPI data.

According to the foregoing method, the warning analysis may obtain the plurality of pieces of target KPI data within the preset duration based on an actual requirement, so that the warning analysis device subsequently determines the feature vector based on the plurality of pieces of KPI data.

In a possible design, the network device may be but is not limited to a wavelength division multiplexing device, a router, a packet transport network device, or the like. In this way, the warning analysis device may determine statuses of a plurality of network devices, to correspondingly maintain different network devices.

In a possible design, after determining the status of the network device, the warning analysis device may display the determined status of the network device to a user by using a visual display device, so that the user can accurately identify a current status of the network device, and correspondingly maintain based on the status of the network device.

According to a second aspect, this application further provides a warning analysis device, where the warning analysis device has a function of implementing the warning analysis device in the foregoing method example. The function may be implemented by hardware, or may be implemented by hardware executing corresponding software. The hardware or the software includes one or more modules corresponding to the foregoing functions.

In a possible design, a structure of the warning analysis device includes an obtaining unit and a processing unit. These units may perform corresponding functions in the foregoing method example. For details, refer to detailed descriptions in the method example. Details are not described herein again.

In a possible design, the structure of the warning analysis device includes a memory and a processor. Optionally, the warning analysis device further includes a communications interface. The communications interface is configured to communicate and interact with another device in a network system. The processor is configured to support the warning analysis device to perform corresponding functions in the foregoing method. The memory is coupled to the processor, and the memory stores a program instruction and data that are necessary for the warning analysis device.

According to a third aspect, this application further provides a network system, where the network system includes a network device layer, a network management layer, a warning analysis layer, and a visual display layer, and specifically includes the warning analysis device, the network device, the network management device, and the visual display device mentioned in the foregoing design.

According to a fourth aspect, this application further provides a computer storage medium, where the computer storage medium stores a computer-executable instruction, and when the computer-executable instruction is invoked by a computer, the computer performs any one of the foregoing methods.

According to a fifth aspect, this application further provides a computer program product including an instruction. When the computer program product runs on a computer, the computer is enabled to perform any one of the foregoing methods.

According to a sixth aspect, this application further provides a chip. The chip is connected to a memory, and is configured to read and execute a program instruction stored in the memory, to implement any one of the foregoing methods.

DETAILED DESCRIPTION OF ILLUSTRATIVE EMBODIMENTS

The following further describes in detail this application with reference to accompanying drawings.

The embodiments of this application provides a method and an apparatus for determining a status of a network device, to resolve a prior-art problem that accuracy of determining the status of the network device is relatively low. The method and the apparatus in this application are based on a same inventive concept. The method and the apparatus have similar problem resolving principles. Therefore, for implementation of the apparatus and the method, mutual reference may be made, and details of repeated parts are not described again.

In the following, some terms in this application are described, so as to help a person skilled in the art has a better understanding.

(1) A network device is a device that provides a business service for a user. The network device may have a plurality of statuses, for example, a normal working state, a low-risk state, a high-risk state, and a fault state. The low-risk state and the high-risk state each may be considered as a potential fault state. The network device may be but is not limited to a wavelength division multiplexing device, a router, a packet transport network device, or the like.

(2) A warning analysis device is a device that determines a status of a network device by analyzing KPI data of the network device. The warning analysis device may be a server, or a cluster including a plurality of servers.

(3) A network management device is a device configured to collect KPI data of a network device and transmit the collected KPI data to a warning analysis device.

(4) KPI data is data used to represent service performance of a network device, and different network devices have different KPI data.

(5) "A plurality of" related in the embodiments of this application means two or more.

To describe the technical solutions in the embodiments of this application more clearly, the following describes in detail, with reference to the accompanying drawings, the method and the apparatus for determining a status of a network device that are provided in the embodiments of this application.

Figure 1:
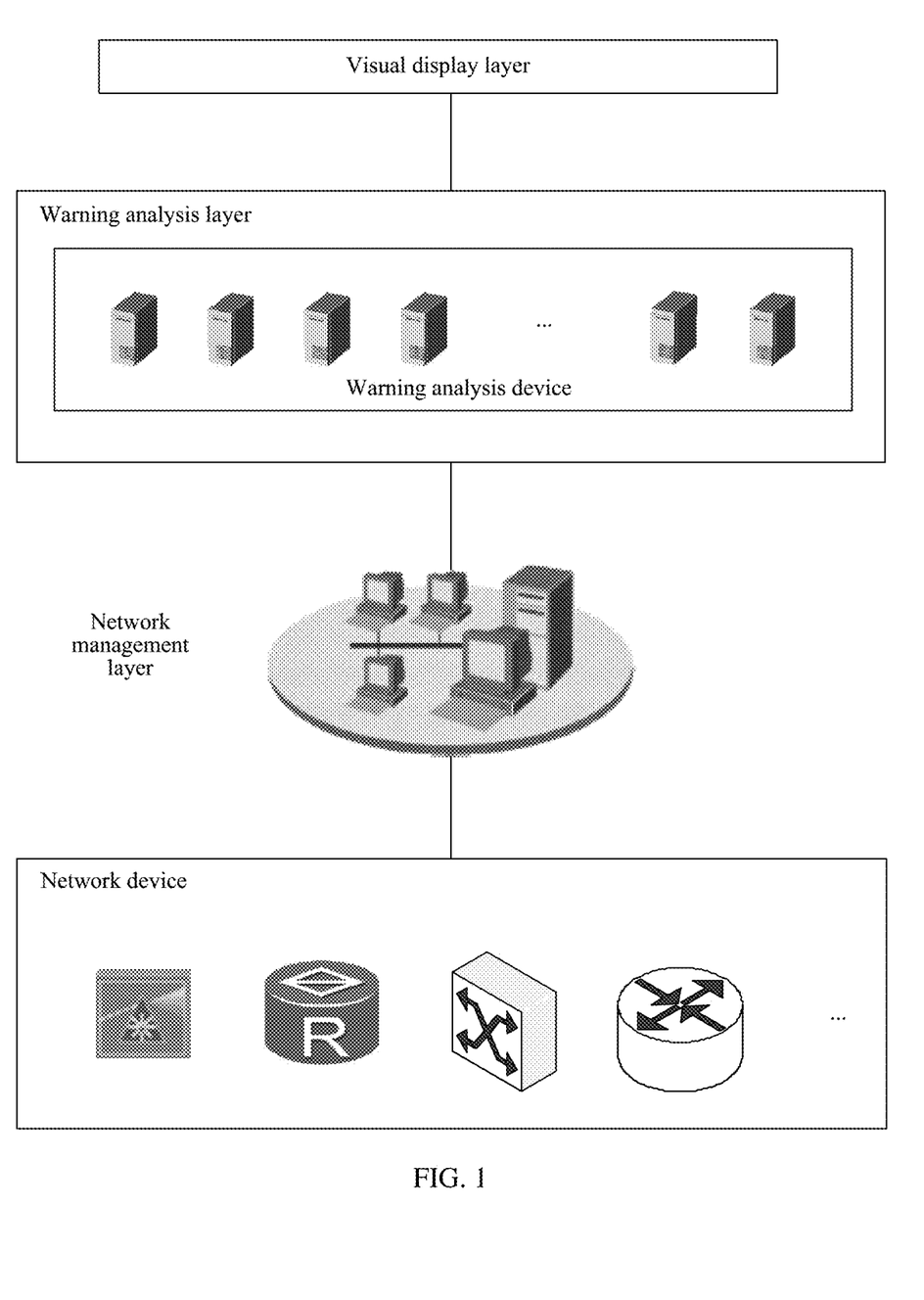
FIG. 1 is a schematic architectural diagram of a network system according to this application.

FIG. 1 shows an architecture of a possible network system to which a method for determining a status of a network device is applicable according to an embodiment of this application. The architecture of the network system includes a network device layer, a network management layer, a warning analysis layer, and a visual display layer.

The network device layer includes a plurality of network devices, which provide different business services for a user. For example, the network device layer may include a network device such as a wavelength division multiplexing device, a router, or a packet transport network device.

The network management layer includes a plurality of network management devices, configured to collect KPI data of any network device at the network device layer, and transmit the collected KPI data to the warning analysis layer, so that a warning analysis device at the warning analysis layer analyzes the KPI data to determine the status of the network device. The network management layer may collect KPI data of the network device from the network device layer by using a standard common object request broker architecture (CORBA) northbound interface. Then, the network management layer may send the collected KPI data of the network device to the warning analysis layer by using the file transfer protocol (FIT).

The warning analysis layer includes the warning analysis device, and the warning analysis device may be one server or a cluster including a plurality of servers. The warning analysis device at the warning analysis layer determines a status of a corresponding network device by analyzing the KPI data transmitted at the network management layer, and displays the determined status of the network device to the user by using the visual display layer.

The visual display layer is configured to implement human-computer interaction. The visual display layer includes at least one visual display device. The user may identify, by using a status of any network device displayed by the at least one visual display device at the visual display layer, service reliability of the network device, and correspondingly maintain based on different statuses of the network device. For example, when it is determined that the network device is in a potential fault state, the user may correspondingly maintain the network device in advance, so as to avoid service interruption caused by a fault of the network device. This can improve service experience of the user.

Figure 2:
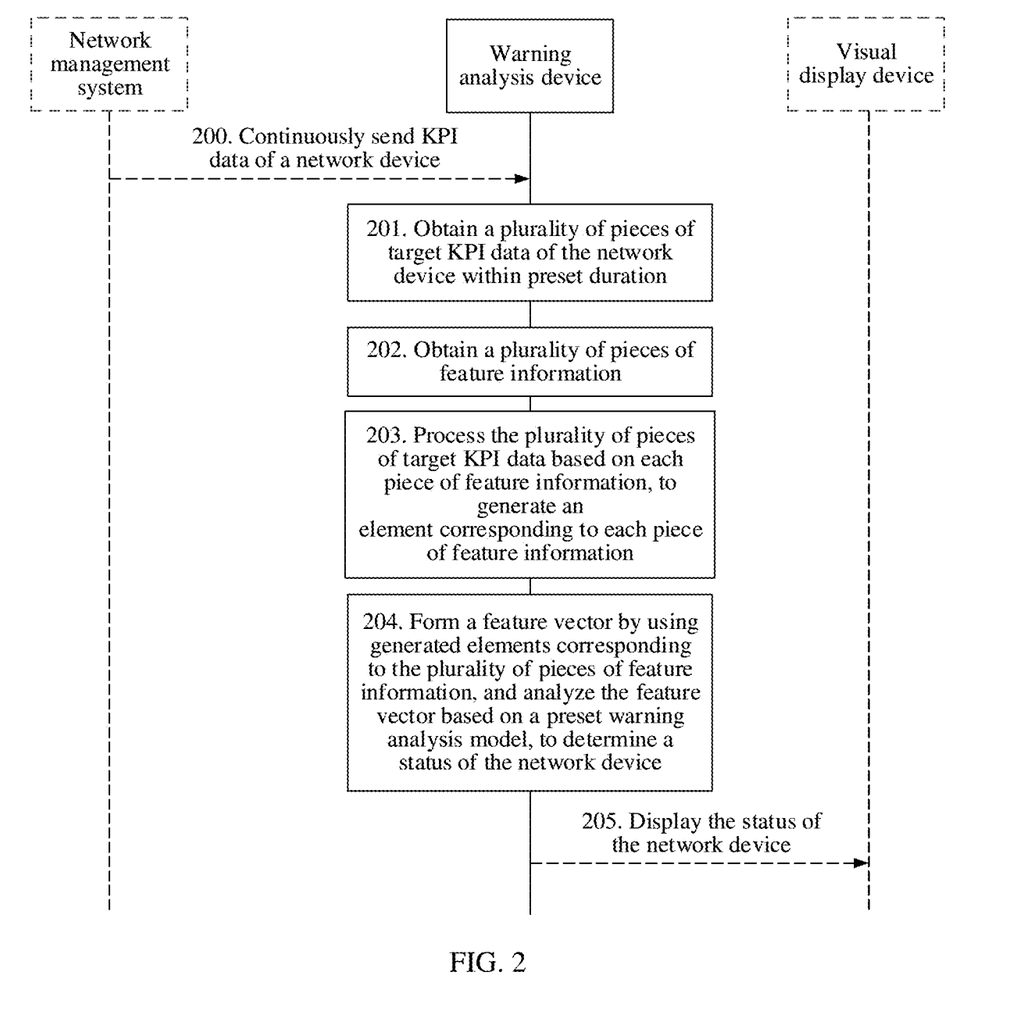
FIG. 2 is a flowchart of a method for determining a status of a network device according to this application.

A method for determining a status of a network device provided in an embodiment of this application is applicable to the network system shown in FIG. 1. Referring to FIG. 2, a specific procedure of the method includes the following steps.

Step 201: A warning analysis device obtains a plurality of pieces of target KPI data of the network device within preset duration.

In an optional implementation, when the warning analysis device performs step 201, a specific method may be as follows: The warning analysis device receives KPI data that is of the network device and that is continuously sent by a network management device, as shown in step 200 in FIG. 2. Then, the warning analysis device obtains the plurality of pieces of KPI data within the preset duration from the received KPI data. Specifically, the preset duration may be preset duration before a moment at which the warning analysis device receives KPI data each time.

During specific implementation, because there are a plurality of types of network devices, different network devices have different KPI data, and the network device may be any one of a wavelength division multiplexing device, a router, a packet transport network device, and the like.

For example, when the network device is the wavelength division multiplexing device, KPI data of the wavelength division multiplexing device may be a pre-correction bit error rate and a post-correction bit error rate. A bit error rate refers to a ratio of a quantity of bits in which a bit error occurs to a total quantity of bits in transmission. Optionally, the bit error rate may be the pre-correction bit error rate or the post-correction bit error rate.

A forward error correction (FEC) algorithm may detect a quantity of error bits, and correct some errors. Therefore, a bit error rate before the FEC algorithm is used is the pre-correction bit error rate, and a bit error rate obtained after the FEC algorithm is used is the post-correction bit error rate.

Specifically, the bit error rate may be represented by an integer bit error parameter. For example, if the bit error parameter is 6, it indicates that the bit error rate is 10 to the power −6. When the bit error rate is 0, it indicates that no bit error occurs. For subsequent analysis, when the bit error rate is 0, the bit error rate may be represented by using a bit error parameter 13. In other words, it indicates that the bit error rate is 10 to the power −13, and it indicates that the bit error rate is close to 0. KPI data of other network devices is not listed one by one herein.

Step 202: The warning analysis device obtains a plurality of pieces of feature information, where any piece of feature information is used to represent a calculation manner of an element that is in a feature vector and that corresponds to the feature information.

Specifically, the warning analysis device presets, for the network device, feature information corresponding to each element in a feature vector required for analyzing the status of the network device. Therefore, after obtaining the plurality of pieces of target KPI data, the warning analysis device may obtain the plurality of pieces of feature information, so that the warning analysis device can accurately perform the subsequent step 203.

The example in which the network device is the wavelength division multiplexing device is still used for description, the feature vector preset by the warning analysis device for the wavelength division multiplexing device successively includes a quantity of service interruptions, a worst value of KPI trend deterioration, a worst value of fluctuation values, an average value of fluctuation values, a worst value of a threshold distance, and an average value of the threshold distance. The quantity of service interruptions, the worst value of KPI trend deterioration, the worst value of fluctuation values, the average value of fluctuation values, the worst value of a threshold distance, and the average value of the threshold distance may be considered as a plurality of pieces of feature information. In this way, the KPI data may be analyzed by using a big data technology, to obtain a corresponding element based on each piece of feature information, and finally a feature vector including six elements is formed.

For example, a calculation manner that is of a corresponding element and that can be represented by each piece of feature information may specifically be as follows: The warning analysis device may determine, based on a plurality of post-correction bit error rates in a plurality of pieces of target KPI data of the wavelength division multiplexing device, whether each collection point of the wavelength division multiplexing device within preset duration is faulty, calculate a quantity of service interruptions within the preset duration, and the quantity of service interruptions may be a positive integer, calculate fluctuation values, KPI trend values, and a threshold distance of each collection point of the wavelength division multiplexing device within the preset duration based on a plurality of pre-correction bit error rates, calculate a worst value of fluctuation values and an average value of the fluctuation values within the preset duration based on the fluctuation values, calculate a worst value of a threshold distance and an average value of the threshold distance within the preset duration based on the threshold distance, and four feature values may be positive real numbers in [0, 100], and calculate a worst value of the KPI trend values within the preset duration based on the KPI trend values. In other words, the worst value of KPI trend deterioration is obtained, and the worst value of KPI trend deterioration may be any real number.

The preset duration in the calculation manner represented by each piece of feature information may be the same, namely, the preset duration, or may be different duration, and may specifically be a part of the preset duration. For example, the preset duration for obtaining the plurality of target KPIs may be 30 days, the preset duration related to the quantity of service interruptions may be 30 days, the preset duration related to the worst value of fluctuation values, the average value of the fluctuation values, the worst value of a threshold distance, and the average value of the threshold distance may be one day, and the preset duration related to the worst value of KPI trend deterioration may be seven days. One day and seven days are a part of the preset duration 30 days.

Step 203: The warning analysis device processes the plurality of pieces of target KPI data based on each piece of feature information, to generate an element corresponding to each piece of feature information.

In an optional implementation, the warning analysis device processes the plurality of pieces of target KPI data based on each piece of feature information, to generate the element corresponding to each piece of feature information. Specifically, the element may be obtained based on a calculation manner of the element corresponding to the feature information represented by each piece of feature information.

For example, the example in which the network device is the wavelength division multiplexing device is still used for description. With reference to the description of step 202, a process of obtaining each element through calculation is specifically described as follows:

A. Quantity of Service Interruptions

First, the warning analysis device determines whether the wavelength division multiplexing device is faulty by using a post-correction bit error rate (denoted as aft). A fault is denoted as f, and a calculation method of f may be shown in the following formula 1:

$$f = \begin{cases} 1 & aft = 13 \\ 0 & aft\, != 13 \end{cases} \quad \text{formula 1}$$

When aft is equal to 13 (in other words, the post-correction bit error rate is 0) and f is 1, it indicates that the wavelength division multiplexing device is faulty. In other words, the service is interrupted. When aft is not 13 and f is 0, it indicates that the wavelength division multiplexing device is not faulty. In other words, the service is not interrupted. Specifically, 13 described in formula 2 represents that a bit error parameter is 13 when the post-correction bit error rate is 0.

Then, the warning analysis device calculates the quantity of service interruptions of the wavelength division multiplexing device within the preset duration (which may be 30 days), and records the quantity of service interruptions as a fault. A method for calculating the fault may be shown in the following formula 2:

$$\text{fault} = \begin{cases} 1 & \text{A fault occurs for the first time} \\ \text{fault} & \text{No fault occurs or a last fault } occurs within \text{ one day} \\ \text{fault} + 1 & \text{A fault occurs and time since a } last fault \text{ occurs is longer than one day} \end{cases} \quad \text{formula 2}$$

Figure 3:
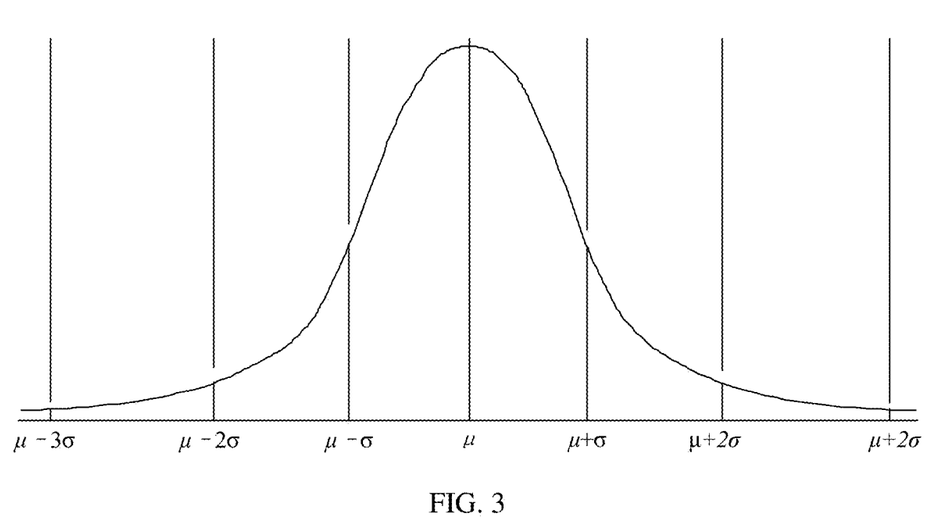
FIG. 3 is a schematic diagram of removing an exception point of a pre-correction bit error rate according to this application.

B. Worst Value of Fluctuation Values and Average Value of the Fluctuation Values Specifically, the warning analysis device may first process abnormal values and noise parts of the plurality of pre-correction bit error rates of the wavelength division multiplexing device, calculate stable values of the plurality of pre-correction bit error rates within first preset duration (which may be 30 days), calculate a distance between a pre-correction bit error rate and a stable value at a current moment in real time, determine fluctuation values based on the distance, and finally calculate a worst value and an average value of fluctuation values of each point within second preset duration (which may be one day). A specific calculation process may be as follows:

Specifically, the warning analysis device may use a three-sigma (sigma, σ) rule to remove exception points of data of the plurality of pre-correction bit error rates. As shown in FIG. 3, data of the pre-correction bit error rate except for [u−3σ, u+3σ] is an exception point. u is an expected value of the pre-correction bit error rate. In addition, the warning analysis device may remove noise of the plurality of pre-correction bit error rates by using a performance evaluation process algebra (FEPA) algorithm analysis method, and the warning analysis device calculates an average value of the plurality of pre-correction bit error rates obtained after the exception point and the noise are removed within the preset duration, to obtain a stable value. Then, the warning analysis device calculates fluctuation values dev of each sampling point based on a difference between a pre-correction bit error rate and a stable value of each sampling point. Specifically, the following formula 3 may be used:

$$dev = \begin{cases} 100 & x \geq \bar{x} \\ 100 * \left(\frac{x-1}{\bar{x}-1}\right) & x < \bar{x} \end{cases} \quad \text{formula 3}$$

In formula 3, x is a pre-correction bit error rate of each sampling point, and $\bar{x}$ is a stable value. Finally, a worst value dev_min of fluctuation values in the preset duration and an average value dev_avg of the fluctuation values are calculated based on the obtained fluctuation values of each point. Specifically, the following formula 4 and formula 5 may be respectively used:

$$\text{dev\_min} = \min(dev_1, dev_2, dev_3 \ldots dev_n) \quad \text{formula 4}$$

$$\text{dev\_avg} = \frac{\sum_{i=1}^{n} devi}{n} \quad \text{formula 5}$$

n in the formula 4 and formula 5 is a quantity of samples of the pre-correction bit error rate within the preset duration.

C. Worst Value of a Threshold Distance and Average Value of the Threshold Distance Specifically, the warning analysis device configures a pre-correction bit error rate threshold that can be supported by the wavelength division multiplexing device. When the pre-correction bit error rate is greater than a hardware feature threshold of the wavelength division multiplexing device, a closer pre-correction bit error rate to the hardware feature threshold indicates poorer reliability of the wavelength division multiplexing device. In this case, a threshold distance S of the wavelength division multiplexing device is shown in the following formula 6. When the pre-correction bit error rate is lower than the hardware feature threshold, a threshold distance of the device is 0, as shown in formula 6:

$$S = \begin{cases} x < v & 0 \\ x \geq v & 100 \times \dfrac{x-v}{x_{max}-v} \end{cases} \quad \text{formula 6}$$

In formula 6, x is the pre-correction bit error rate, $x_{max}$ is a maximum value of the pre-correction bit error rate within the preset duration, and v is the hardware feature threshold.

Then, the warning analysis device calculates a worst value S_min of a threshold distance and an average value S_avg of the threshold distance within the preset duration by using the following formula 7 and formula 8 respectively:

$$S\_min = min(S_1, S_2, S_3 ... S_m) \quad \text{formula 7}$$

$$S\_avg = \dfrac{\sum_{j=1}^{m} S_j}{m} \quad \text{formula 8}$$

m in the formula 8 and formula 9 is a quantity of samples of the pre-correction bit error rate within the preset duration.

D. Worst Value of KPI Trend Deterioration

Specifically, the warning analysis device performs exponentially weighted moving average (EWMA) processing on KPI data within the preset duration (which may be seven days), and then performs linear fitting processing to obtain the worst value of KPI trend deterioration. The worst value is denoted as slope.

According to the foregoing method, the element corresponding to each piece of feature information may be obtained, to obtain the feature vector.

Step 204: The warning analysis device forms the feature vector by using generated elements corresponding to the plurality of pieces of feature information, and analyzes the feature vector based on a preset warning analysis model, to determine the status of the network device.

Specifically, a plurality of elements forming the feature vector may be obtained by using the step 203, and the warning analysis may directly form the feature vector by using the plurality of elements. For example, an example in which the network device is the wavelength division multiplexing device is used. The warning analysis device may form a feature vector T={fault, slope, dev_avg, dev_min, S_avg, S_min} by using elements fault, slope, dev_avg, dev_min, S_avg, and S_min that correspond to the plurality of pieces of feature information related to the wavelength division multiplexing device and that are obtained in the foregoing example in step 203. Further, the warning analysis device may analyze the feature vector based on the preset warning analysis model, to determine a status of the wavelength division multiplexing device.

In an optional implementation, before analyzing the feature vector based on the preset warning analysis model, the warning analysis device further needs to generate the warning analysis model. Specifically, a process in which the warning analysis device generates the warning analysis model may be as follows: The warning analysis device obtains feature vector samples corresponding to different statuses of the network device, and performs logistic regression processing on each status and a feature vector sample corresponding to the status, to obtain the warning analysis model.

Specifically, the status of the network device may include a normal working state (which may also be referred to as a healthy state), a low-risk state, a high-risk state, and a fault state. For example, the wavelength division multiplexing device is used as an example. Based on an empirical value, it can be learned that:

When the wavelength division multiplexing device is in the normal working state, in a corresponding feature vector, a fault occurs within preset duration. A worst value of fluctuation values and an average value of the fluctuation values, and a worst value of a threshold distance and an average value of the threshold distance are greater than 90, and a worst value of KPI trend deterioration is greater than 0. In this case, the feature vector corresponding to the normal working state may be {0, 0.1, 100, 100, 100, 100}.

When the wavelength division multiplexing device is in the low-risk state, a value of a corresponding feature vector is slightly worse than a value of the feature vector when the wavelength division multiplexing device is in the normal working state. For example, no fault occurs or only one fault occurs within the preset duration. A worst value of fluctuation values and an average value of the fluctuation values, and a worst value of a threshold distance and an average value of the threshold distance are all less than 90, but the average value of the fluctuation values and the average value of the threshold distance are greater than 70, and a worst value of KPI trend deterioration is not a negative number. In this case, the feature vector corresponding to the low-risk state may be {0, 0.02, 81.52, 71.89, 83.46, 71}.

When the wavelength division multiplexing device is in the high-risk state, a value of a corresponding feature vector is slightly worse than a value of the feature vector when the wavelength division multiplexing device is in the low-risk state. For example, a quantity of times that a fault occurs within the preset duration is greater than 2. An average value of fluctuation values and an average value of a threshold distance value are less than 70, and a worst value of KPI trend deterioration is less than 0. In this case, the feature vector corresponding to the high-risk state may be {5, −4.91, 66.1, 0, 24.43, 0}.

When the wavelength division multiplexing device is in the fault state, in a corresponding feature vector, a quantity of times that a fault occurs within the preset duration is greater than 5. A worst value of fluctuation values and an average value of the fluctuation values are less than 40, a worst value of a threshold distance and an average value of the threshold distance are 0, and a worst value KPI trend deterioration is less than 0. In this case, the feature vector corresponding to the fault state may be {8, −2.64, 28.01, 27.06, 0, 0}.

Figure 4:
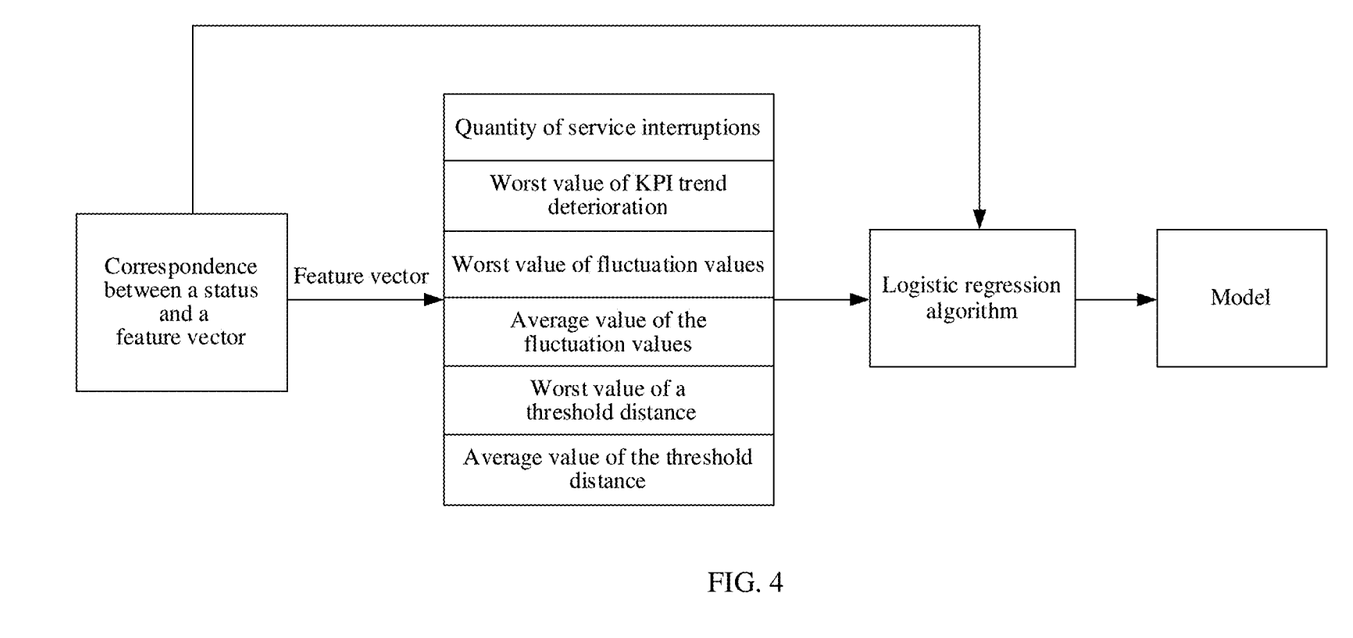
FIG. 4 is a schematic diagram of a generation process of a warning analysis model according to this application.

Based on the above-described feature vectors corresponding to different known statuses, a feature vector sample corresponding to each status may be learned. The warning analysis device performs model training on each status and the feature vector sample corresponding to the status based on a logistic regression algorithm, to generate the warning analysis model. Specifically, an input of the warning analysis model is a feature vector of the network device, and an output result is a probability of each status of the network device, which is determined based on the input feature vector. In other words, a plurality of probabilities may be obtained, so that the status of the network device may be determined based on the plurality of probabilities. For example, a process of generating the warning analysis model corresponding to the wavelength division multiplexing device may be shown in FIG. 4.

In a possible implementation, the warning analysis device analyzes the feature vector based on the preset warning analysis model, to determine the status of the network device. A specific method may be as follows: The warning analysis device analyzes the feature vector based on the warning analysis model, to determine a probability of each status of the network device, multiplies each probability by a preset reference value of a status corresponding to the probability, to obtain a plurality of products; and adds the plurality of products to obtain a status indication value; and the warning analysis device determines a specified indication value range to which the status indication value belongs, and uses a status corresponding to the specified indication value range as the status of the network device.

For example, the warning analysis device analyzes the determined feature vector by using the preset warning analysis model, to obtain a plurality of probabilities {g1, g2, g3, g4}, and g1 is a probability that the network device is in a fault state, g2 is a probability that the network device is in a high-risk state, g3 is a probability that the network device is in a low-risk state, and g4 is a probability that the network device is in a normal working state. Each status corresponds to one reference value, and reference values corresponding to the four statuses may be respectively denoted as h1, h2, h3, and h4. Each reference value corresponds to one value range. For example, h1 corresponds to [9, 10], h2 corresponds to [6.5, 7.5], h3 corresponds to [2.5, 3.5], and h4 corresponds to [0, 0.5]. It is assumed that in a process of determining the status of the network device, preset reference values corresponding to all statuses are 10, 7, 3, and 0, and then with reference to the probabilities g1, g2, g3, and m that correspond to the statuses of the network device and that are obtained by analyzing the feature vector, a status indication value Z may be obtained by using the following formula 9:

$$Z = g1*10 + g2*7 + g3 + g4*0 \quad \text{formula 9}$$

Further, ranges of status indication values are different, and corresponding statuses are also different. The status indication value may be in [0, 10]. A first intermediate value and a second intermediate value are configured to divide the status indication value into three ranges, to be specific, [0, the first intermediate value), [the first intermediate value, the second intermediate value], and (the second intermediate value, 10], and three specified indication value ranges respectively correspond to different statuses. Optionally, the first intermediate value may be set in [6.8, 7.2], and the second intermediate value may be set in [8, 9]. In this way, a determined status of the network device may be more accurate.

For example, as shown in formula 10, after Z is obtained, when Z belongs to [0, the first intermediate value), it is determined that the network device is in the normal working state, when Z belongs to [the first intermediate value, the second intermediate value], the network device is in a potential fault state (including the high-risk state and the low-risk state), and when Z belongs to (second intermediate value, 10], the network device is in the fault state.

In this way, by using the foregoing method, the warning device may determine the specified indication value range to which the status indication value belongs, and further determine the status corresponding to the specified indication value range, to determine the status of the network device.

In a possible implementation, after determining the status of the network device, as shown in step 205 in FIG. 2, the warning analysis device may display the determined status of the network device to a user by using a visual display device, so that the user can accurately identify a current status of the network device, and correspondingly maintain the network device based on the status of the network device.

In an optional implementation, the warning analysis device may determine whether a finally determined status of the network device is a status that the user urgently needs to know based on an actual requirement, and display, to the user, only a status that the user pays attention to. For example, the user pays attention to whether the network device is in the potential fault state. After determining the status of the network device by using the method provided in this embodiment of this application, the warning analysis device further determines whether the network device is in the potential fault state. When determining that the network device is in the potential fault state, the warning analysis device displays the status of the network device to the user. In this way, the user can maintain the network device in advance before the network device is faulty, so as to avoid service interruption caused by a fault of the network device. This can improve service experience of the user.

According to the method for determining the status of the network device provided in this embodiment of this application, the warning analysis device obtains a plurality of pieces of target key performance indicator KPI data of the network device within preset duration, obtains a plurality of pieces of feature information, processes the plurality of pieces of target KPI data based on each piece of feature information, to generate an element corresponding to each piece of feature information, forms the feature vector by using generated elements corresponding to the plurality of pieces of feature information, and analyzes the feature vector based on the preset warning analysis model, to determine the status of the network device. In this way, the status of the network device is determined by analyzing a plurality of pieces of target KPI data within a period of time, instead of by using only data at a moment. This improves the accuracy of determining the network device, so as to reduce an omission of a warning.

Figure 5:
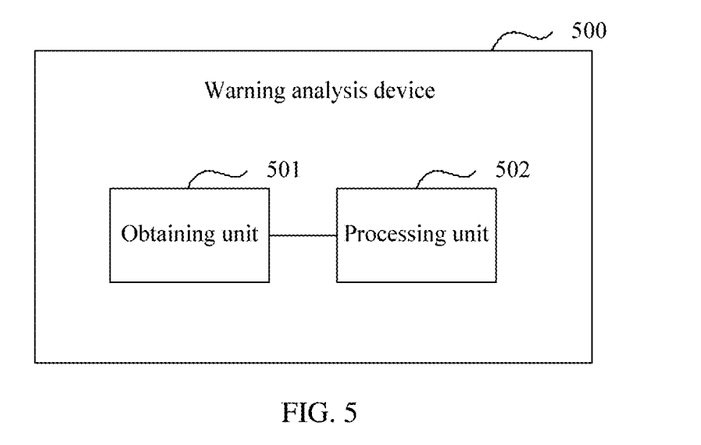
FIG. 5 is a schematic structural diagram of a warning analysis device according to this application.

Based on the foregoing embodiments, an embodiment of this application further provides a warning analysis device. The warning analysis device is applied to the warning analysis device in the network system shown in FIG. 1, and is configured to implement the method for determining a status of a network device shown in FIG. 2. Referring to FIG. 5, the warning analysis device 500 includes an obtaining unit 501 and a processing unit 502.

The obtaining unit 501 is configured to obtain a plurality of pieces of target key performance indicator KPI data of a network device within preset duration, obtain a plurality of $$\text{Status of a network device} = \begin{cases} \text{Normal working state} & 0 \leq Z < \text{First intermediate value} \\ \text{Potential fault state} & \text{First intermediate value} \leq Z \leq \text{Second intermediate value} \\ \text{Fault state} & \text{Second intermediate value} < Z \leq 10 \end{cases} \quad \text{formula 10}$$

pieces of feature information, where any piece of feature information is used to represent a calculation manner of an element that is in a feature vector and that corresponds to the feature information.

The processing unit 502 is configured to process the plurality of pieces of target KPI data based on each piece of feature information, to generate an element corresponding to each piece of feature information, and form the feature vector by using generated elements corresponding to the plurality of pieces of feature information, and analyze the feature vector based on a preset warning analysis model, to determine the status of the network device.

In a possible implementation, when analyzing the feature vector based on the preset warning analysis model, to determine the status of the network device, the processing unit 502 is specifically configured to: analyze the feature vector based on the warning analysis model, to determine a probability of each status of the network device; multiply each probability by a preset reference value of a status corresponding to the probability, to obtain a plurality of products; add the plurality of products to obtain a status indication value; determine a specified indication value range to which the status indication value belongs; and use a status corresponding to the specified indication value range as the status of the network device.

In an optional implementation, the obtaining unit 501 is further configured to obtain feature vector samples corresponding to different network device statuses of the network device. Before analyzing the feature vector based on the preset warning analysis model, the processor 502 is further configured to generate the warning analysis model. After obtaining feature vector samples corresponding to different network device statuses of the network device, the obtaining unit 501 performs logistic regression processing on each network device status and a feature vector sample corresponding to the network device status, to obtain the warning analysis model.

In an optional implementation, the warning analysis device 500 further includes: a receiving unit, configured to receive KPI data that is of the network device and that is continuously sent by a network management device. When obtaining the plurality of pieces of target KPI data of the network device within the preset duration, the obtaining unit 501 is specifically configured to obtain the plurality of pieces of target KPI data within the preset duration from the KPI data received by the receiving unit.

In an optional implementation, the network device may be a wavelength division multiplexing device, a router, a packet transport network device, or the like.

The warning analysis device provided in this embodiment of this application is used, and the warning analysis device obtains a plurality of pieces of target key performance indicator KPI data of the network device within preset duration, obtains a plurality of pieces of feature information, processes the plurality of pieces of target KPI data based on each piece of feature information, to generate an element corresponding to each piece of feature information, forms the feature vector by using generated elements corresponding to the plurality of pieces of feature information, and analyzes the feature vector based on a preset warning analysis model, to determine the status of the network device. In this way, the status of the network device is determined by analyzing a plurality of pieces of target KPI data within a period of time, instead of by using only data at a moment. This improves the accuracy of determining the network device, so as to reduce an omission of a warning.

It should be noted that, in this embodiment of this application, unit division is merely an example, and is merely a logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 6:
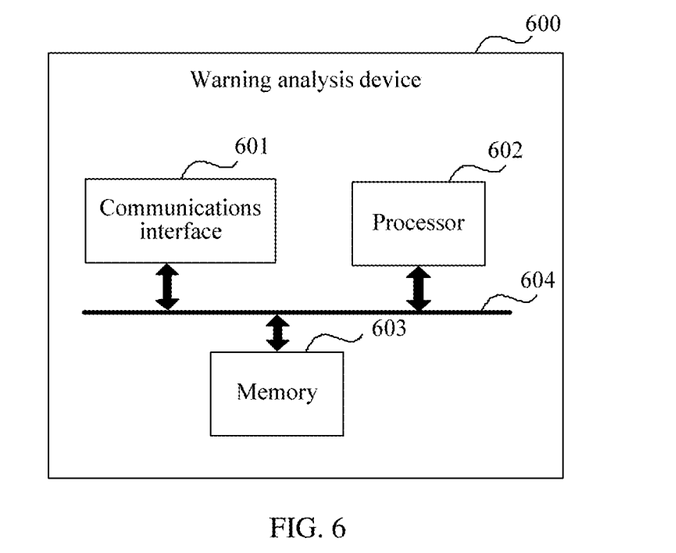
FIG. 6 is a structural diagram of a warning analysis device according to this application.

Based on the foregoing embodiments, an embodiment of this application further provides a warning analysis device. The warning analysis device is applied to the warning analysis device in the network system shown in FIG. 1, and is configured to implement the method for determining a status of a network device shown in FIG. 2. Referring to FIG. 6, the warning analysis device 600 includes a processor 602 and a memory 603.

The processor 602 may be a central processing unit (CPU), a network processor (NP), or a combination of the CPU and the NP. The processor 602 may further include a hardware chip. The foregoing hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The processor 602 and the memory 603 are connected to each other. Optionally, the processor 602 and the memory 603 are connected to each other by using a bus 604. The bus 604 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 6, but this does not mean that there is only one bus or only one type of bus.

form the feature vector by using generated elements corresponding to the plurality of pieces of feature information, and analyze the feature vector based on a preset warning analysis model, to determine the status of the network device.

The memory 603 is configured to store a program and the like. Specifically, the program may include program code, and the program code includes a computer operation instruction. The memory 603 may include a RAM, and may further include a non-volatile memory, for example, at least one magnetic disk memory. The processor 602 executes the application program stored in the memory 603, to implement the foregoing function, so as to implement the method for determining a status of a network device shown in FIG. 2.

In a possible implementation, when analyzing the feature vector based on the preset warning analysis model, to determine the status of the network device, the processor 602 is specifically configured to: analyze the feature vector based on the warning analysis model, to determine a probability of each status of the network device; multiply each probability by a preset reference value of a status corresponding to the probability, to obtain a plurality of products; add the plurality of products to obtain a status indication value; determine a specified indication value range to which the status indication value belongs; and use a status corresponding to the specified indication value range as the status of the network device.

In an optional implementation, before analyzing the feature vector based on the preset warning analysis model, the processor 602 is further configured to: generate the warning analysis model: obtain feature vector samples corresponding to different network device statuses of the network device; and perform logistic regression processing on each network device status and a feature vector sample corresponding to the network device status, to obtain the warning analysis model.

In an optional implementation manner, the warning analysis device 600 further includes: a communications interface 601, configured to receive data. When obtaining the plurality of pieces of target KPI data of the network device within the preset duration, the processor 602 is specifically configured to control the communications interface 601 to receive the KPI data that is of the network device and that is continuously sent by a network management device, and obtain the plurality of pieces of target KPI data within the preset duration from the received KPI data.

In an optional implementation, the network device may be a wavelength division multiplexing device, a router, a packet transport network device, or the like.

The warning analysis device provided in this embodiment of this application is used, and the warning analysis device obtains a plurality of pieces of target key performance indicator KPI data of the network device within preset duration, obtains a plurality of pieces of feature information, processes the plurality of pieces of target KPI data based on each piece of feature information, to generate an element corresponding to each piece of feature information, forms the feature vector by using generated elements corresponding to the plurality of pieces of feature information, and analyzes the feature vector based on a preset warning analysis model, to determine the status of the network device. In this way, the status of the network device is determined by analyzing a plurality of pieces of target KPI data within a period of time, instead of by using only data at a moment. This improves the accuracy of determining the network device, so as to reduce an omission of a warning.

To sum up, according to the method and the apparatus for determining the status of the network device provided in the embodiments of this application, the warning analysis device obtains the plurality of pieces of target key performance indicator KPI data of the network device within preset duration, obtains the plurality of pieces of feature information, processes the plurality of pieces of target KPI data based on each piece of feature information, to generate the element corresponding to each piece of feature information, forms the feature vector by using generated elements corresponding to the plurality of pieces of feature information, and analyzes the feature vector based on the preset warning analysis model, to determine the status of the network device. In this way, the status of the network device is determined by analyzing a plurality of pieces of target KPI data within a period of time, instead of by using only data at a moment. This improves the accuracy of determining the network device, so as to reduce an omission of a warning.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present application have been described, a person skilled in the art can make changes and modifications to these embodiments once they learn the basic inventive concept. Therefore, the following claims are intended to be construed as to cover the preferred embodiments and all changes and modifications falling within the scope of this application.

Obviously, a person skilled in the art can make various modifications and variations to embodiments of this application without departing from the scope of this application. This application is intended to cover these modifications and variations provided that they fall within the scope of protection defined by the following claims and their equivalent technologies.

What is claimed is:

1. A method, comprising:
obtaining, by a first device, a plurality of pieces of target key performance indicator (KPI) data of a network device within a duration, wherein obtaining, by the first device, the plurality of pieces of target KPI data of the network device within the duration comprises:
receiving, by the first device, KPI data of the network device that is continuously sent by a network management device; and
obtaining, by the first device, the plurality of pieces of target KPI data within the duration from the received KPI data;
processing, by the first device, the plurality of pieces of target KPI data based on a plurality of pieces of feature information, to calculate a plurality of elements corresponding to the plurality of pieces of feature information, an element of the plurality of elements corresponding to each piece of feature information, and each piece of feature information indicating a calculation manner of processing the plurality of pieces of target KPI to calculate the corresponding element;
forming, by the first device, a feature vector by combining each of the plurality of elements corresponding to the plurality of pieces of feature information into the feature vector; and
analyzing, by the first device, the feature vector using a warning analysis model, to determine a first status of the network device.

2. The method according to claim 1, wherein the plurality of pieces of feature information comprises a plurality of the following: a quantity of service interruptions, a worst value of KPI trend deterioration, a worst value of fluctuation values, an average value of fluctuation values, a worst value of a threshold distance, or an average value of the threshold distance.

3. The method according to claim 1, further comprising:
obtaining, by the first device, the plurality of pieces of feature information.

4. The method according to claim 1, wherein analyzing, by the first device, the feature vector using the warning analysis model, to determine the first status of the network device, comprises:
analyzing, by the first device, the feature vector using the warning analysis model, to determine a probability of each status of the network device; and
determining, by the first device, the first status of the network device based on the probability of each status of the network device.

5. The method according to claim 4, wherein determining, by the first device, the first status of the network device based on the probability of each status of the network device comprises:
obtaining, by the first device, a status indication value based on the probability of each status of the network device;
determining, by the first device, a specified indication value range to which the status indication value belongs; and
using, by the first device, a status corresponding to the specified indication value range as the first status of the network device.

6. The method according to claim 5, wherein obtaining, by the first device, the status indication value based on the probability of each status of the network device comprises:
multiplying, by the first device, each probability by a reference value of a status corresponding to the respective each probability, to obtain a plurality of products; and
adding, by the first device, the plurality of products to obtain the status indication value.

7. The method according to claim 1, wherein before the analyzing, by the first device, the feature vector based on the warning analysis model, the method further comprises:
generating, by the first device, the warning analysis model.

8. The method according to claim 7, wherein generating, by the first device, the warning analysis model comprises:
obtaining, by the first device, feature vector samples corresponding to different statuses of the network device; and
performing, by the first device, logistic regression processing on each status and a feature vector sample corresponding to the respective status of the network device, to obtain the warning analysis model.

9. The method according to claim 1, wherein the network device is any of the following devices: a wavelength division multiplexing device, a router, or a packet transport network device.

10. A first device, comprising:
a non-transitory computer readable medium, configured to store a program instruction; and
a processor, configured to invoke the program instruction in the non-transitory computer readable medium to perform the following operations:
obtaining a plurality of pieces of target key performance indicator (KPI) data of a network device within a duration, wherein obtaining the plurality of pieces of target KPI data of the network device within the duration comprises:
receiving KPI data of the network device that is continuously sent by a network management device; and
obtaining the plurality of pieces of target KPI data within the duration from the received KPI data;
processing the plurality of pieces of target KPI data based on a plurality of pieces of feature information, to calculate a plurality of elements corresponding to the plurality of pieces of feature information, an element of the plurality of elements corresponding to each piece of feature information, and each piece of feature information indicating a calculation manner of processing the plurality of pieces of target KPI to calculate the corresponding element;
forming a feature vector by combining each of the plurality of elements corresponding to the plurality of pieces of feature information into the feature vector; and
analyzing the feature vector using a warning analysis model, to determine a first status of the network device.

11. The first device according to claim 10, wherein the plurality of pieces of feature information comprises one or more of the following: a quantity of service interruptions, a worst value of KPI trend deterioration, a worst value of fluctuation values, an average value of fluctuation values, a worst value of a threshold distance, or an average value of the threshold distance.

12. The first device according to claim 10, wherein the processor is further configured to invoke the program instruction in the non-transitory computer readable medium to perform the following operation:
obtaining the plurality of pieces of feature information.

13. The first device according to claim 10, wherein analyzing the feature vector based on the warning analysis model, to determine the status of the network device, comprises:
    analyzing the feature vector based on the warning analysis model, to determine a probability of each status of the network device; and
    determining the first status of the network device based on the probability of each status of the network device.

14. The first device according to claim 13, wherein determining the first status of the network device based on the probability of each status of the network device comprises:
    obtaining a status indication value based on the probability of each status of the network device;
    determining a specified indication value range to which the status indication value belongs; and
    using a status corresponding to the specified indication value range as the first status of the network device.

15. The first device according to claim 10, wherein the processor is further configured to invoke the program instruction in the non-transitory computer readable medium to perform the following operation:
    generating the warning analysis model, wherein the generating the warning analysis model comprises:
        obtaining feature vector samples corresponding to different statuses of the network device; and
        performing logistic regression processing on each status and a feature vector sample corresponding to the status of the network device, to obtain the warning analysis model.

16. A non-transitory computer readable medium, wherein the non-transitory computer readable medium stores a computer-executable instruction, and when the computer-executable instruction is invoked by a computer, the computer is enabled to:
    obtain a plurality of pieces of target key performance indicator (KPI) data of a network device within a duration, wherein obtaining the plurality of pieces of target KPI data of the network device within the duration comprises:
        receiving KPI data of the network device that is continuously sent by a network management device; and
        obtaining the plurality of pieces of target KPI data within the duration from the received KPI data;
    process the plurality of pieces of target KPI data based on a plurality of pieces of feature information, to calculate a plurality of elements corresponding to the plurality of pieces of feature information, an element of the plurality of elements corresponding to each piece of feature information, and each piece of feature information indicating a calculation manner of processing the plurality of pieces of target KPI to calculate the corresponding element;
    form a feature vector by combining each of the plurality of elements corresponding to the plurality of pieces of feature information into the feature vector; and
    analyze the feature vector using a warning analysis model, to determine a first status of the network device.

* * * * *